United States Patent
Maehara et al.

(10) Patent No.: US 8,051,816 B2
(45) Date of Patent: Nov. 8, 2011

(54) V-TYPE ENGINE FOR VEHICLE

(75) Inventors: Hayato Maehara, Saitama (JP);
Kazuhito Hotta, Saitama (JP);
Toshiyuki Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 488 days.

(21) Appl. No.: 12/201,861

(22) Filed: Aug. 29, 2008

(65) Prior Publication Data

US 2009/0056657 A1    Mar. 5, 2009

(30) Foreign Application Priority Data

Aug. 31, 2007    (JP) ................. 2007-227102

(51) Int. Cl.
*F01L 1/34*    (2006.01)

(52) U.S. Cl. ................. 123/90.16; 123/90.44

(58) Field of Classification Search ........... 123/90.44, 123/90.48, 90.16
See application file for complete search history.

(56) References Cited

U.S. PATENT DOCUMENTS

| | | | |
|---|---|---|---|
| 6,076,491 A * | 6/2000 | Allen ................. | 123/90.16 |
| 6,397,809 B1 * | 6/2002 | Sayama et al. ......... | 123/192.2 |
| 2006/0213470 A1 * | 9/2006 | Maehara et al. ........ | 123/90.16 |

FOREIGN PATENT DOCUMENTS

| | | |
|---|---|---|
| EP | 1 632 663 A1 | 3/2006 |
| JP | 4-203431 A | 7/1992 |
| JP | 04203460 A * | 7/1992 |
| JP | 2002-180812 A | 6/2002 |
| JP | 2006-207431 A | 8/2006 |

* cited by examiner

*Primary Examiner* — Zelalem Eshete
(74) *Attorney, Agent, or Firm* — Birch, Stewart, Kolasch & Birch, LLP

(57) ABSTRACT

A V-type engine for a vehicle is provided with front and rear banks including intake and exhaust valves exposed to a combustion chamber, a valve operating device for operating the engine valves, a valve stop mechanism for stopping the operation of the engine valves according to an operational condition of the vehicle, and an actuator for driving a throttle valve. A valve stop mechanism is provided in either the front bank or the rear bank. An actuator provided in one of the front bank and the rear bank excluding the valve stop mechanism is lower in height than the actuator provided in the other of the front bank. By reducing the height of one of the front bank or the rear bank, an adequate capacity of an air cleaner and a fuel tank can be ensured

20 Claims, 14 Drawing Sheets

V-TYPE ENGINE FOR VEHICLE

CROSS-REFERENCE TO RELATED APPLICATION

The present application claims priority under 35 U.S.C. §119 to Japanese Patent Application No. 2007-227102, filed Aug. 31, 2007, the entire contents of which are hereby incorporated by reference.

BACKGROUND OF THE INVENTION

1. Field of the Invention

The present invention relates to a V-type engine for a vehicle, particularly for a motorcycle including a valve stop mechanism for stopping the operation of engine valves and an electric actuator for driving a throttle valve.

2. Description of Background Art

Conventionally known is a motorcycle including a V-type engine having a front bank and a rear bank, wherein each bank is provided with a DOHC type valve operating device and a valve stop mechanism (see Japanese Patent Laid-Open No. 2002-180812, for example). Further, a plurality of actuators (electric motors) for driving throttle valves for the front bank and the rear bank are provided in a V-shaped space defined between the front bank and the rear bank in such a manner that all the actuators are set at the same height (see Japanese Patent Laid-Open No. Hei 4-203431, for example).

In the V-type engine having the valve stop mechanism in each bank as mentioned above, the cylinder head in each bank tends to become large in size because of the presence of the valve stop mechanism. Accordingly, the vertical size of the engine is increased by the large-sized cylinder head and a cylinder head cover connected to the upper end of this cylinder head. In the case that such a V-type engine having the valve stop mechanism in each bank includes a plurality of actuators for driving throttle valves for the front bank and the rear bank, wherein these actuators are provided in a V-shaped space defined between the front bank and the rear bank in such a manner that all the actuators are set at the same height as mentioned above, the vertical size of the engine may be further increased. As a result, an air cleaner and a fuel tank both provided above the engine are increased in height in order to ensure the capacity, causing an increase in vertical size of the vehicle.

SUMMARY AND OBJECTS OF THE INVENTION

It is accordingly an object of the present invention to ensure the capacity of an air cleaner and a fuel tank in a motorcycle including a V-type engine provided with a valve stop mechanism and a throttle valve driving actuator by reducing the height of at least one of the front bank and the rear bank or the height of the front bank in particular.

According to an embodiment of the present invention, a V-type engine is provided for a vehicle having a front bank and a rear bank inclined in the longitudinal direction of the vehicle so as to form a V shape, and each of the front bank and the rear bank includes a cylinder block having a cylinder; a piston slidably fitted in the cylinder; a cylinder head connected to the upper end of the cylinder block; a cylinder head cover connected to the upper end of the cylinder head; a combustion chamber defined between the cylinder head and the piston; engine valves as intake and exhaust valves exposed to the combustion chamber; a valve operating device provided between the cylinder head and the cylinder head cover for operating the engine valves; and an actuator for driving a throttle valve. Either the front bank or the rear bank is provided with a valve stop mechanism for stopping the operation of the engine valves according to an operational condition of the vehicle; and the actuator provided in one of the front bank and the rear bank excluding the valve stop mechanism is lower in height than the actuator provided in the other of the front bank and the rear bank including the valve stop mechanism.

According to an embodiment of the present invention, the valve operating device provided in the front bank is a unicam type valve operating device including a single camshaft and a rocker arm associated therewith for operating the intake and exhaust valves in combination; the valve operating device provided in the rear bank is a DOHC type valve operating device including an intake camshaft for operating the intake valve and an exhaust camshaft for operating the exhaust valve; and the valve stop mechanism is provided in only the rear bank.

According to an embodiment of the present invention, the actuator in each bank is located close to the corresponding cylinder head cover.

According to an embodiment of the present invention, the valve stop mechanism is provided in only one of the banks to thereby make the size of the other bank smaller. Further, the throttle valve driving actuator in the bank having no valve stop mechanism is lower in height than the throttle valve driving actuator in the bank having the valve stop mechanism. With this arrangement, an empty space can be formed above the bank having no valve stop mechanism, and the capacity of the air cleaner and the fuel tank can be ensured by utilizing this empty space. Further, the vertical size of the vehicle can be reduced.

According to an embodiment of the present invention, the valve operating device in the front bank is of a unicam type, that is, the valve operating device including a single camshaft and a rocker arm associated therewith for operating the intake and exhaust valves in combination, and the valve operating device in the rear bank is of a DOHC type. Accordingly, the height of the front bank can be set smaller than that of the rear bank. Further, the throttle valve driving actuator in the front bank is lower in height than the throttle valve driving actuator in the rear bank, so that an empty space can be formed above the front bank.

Further, the valve stop mechanism is provided in only the rear bank. Accordingly, the cylinder head in the front bank can be reduced in size, so that the height of the front bank can be reduced. Accordingly, an empty space can be formed above the front bank.

The capacity of the air cleaner and the fuel tank can be ensured by utilizing this empty space, so that the vertical size of the vehicle can be reduced. Further, the cylinder head and the cylinder head cover in the front bank can be reduced in size, so that the front wheel of the vehicle can be moved in position toward the rear side of the vehicle, thereby contributing to a decrease in longitudinal size of the vehicle.

Further, the front bank has no valve stop mechanism. That is, the engine valves in the front bank are always operated during the operation of the vehicle. The front bank can readily receive a running wind during running of the vehicle, thereby improving the cooling effect to the front bank. On the other hand, when the engine valves in the rear bank having the valve stop mechanism are in a nonoperating condition, excess cooling of the rear bank by the running wind can be suppressed.

In addition, the throttle valve driving actuator in each bank is located close to the corresponding cylinder head cover. Further, a case for accommodating a driving motor in the actuator can also be located close to the corresponding cylinder head cover. Accordingly, the amount of upward projection of the actuator can be suppressed, and the capacity of the air cleaner and the fuel tank can be ensured by utilizing the empty space above the corresponding cylinder head. Further, as compared with the case that the actuator is provided in the space between throttle bodies in the front and rear banks, the actuator can be easily provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
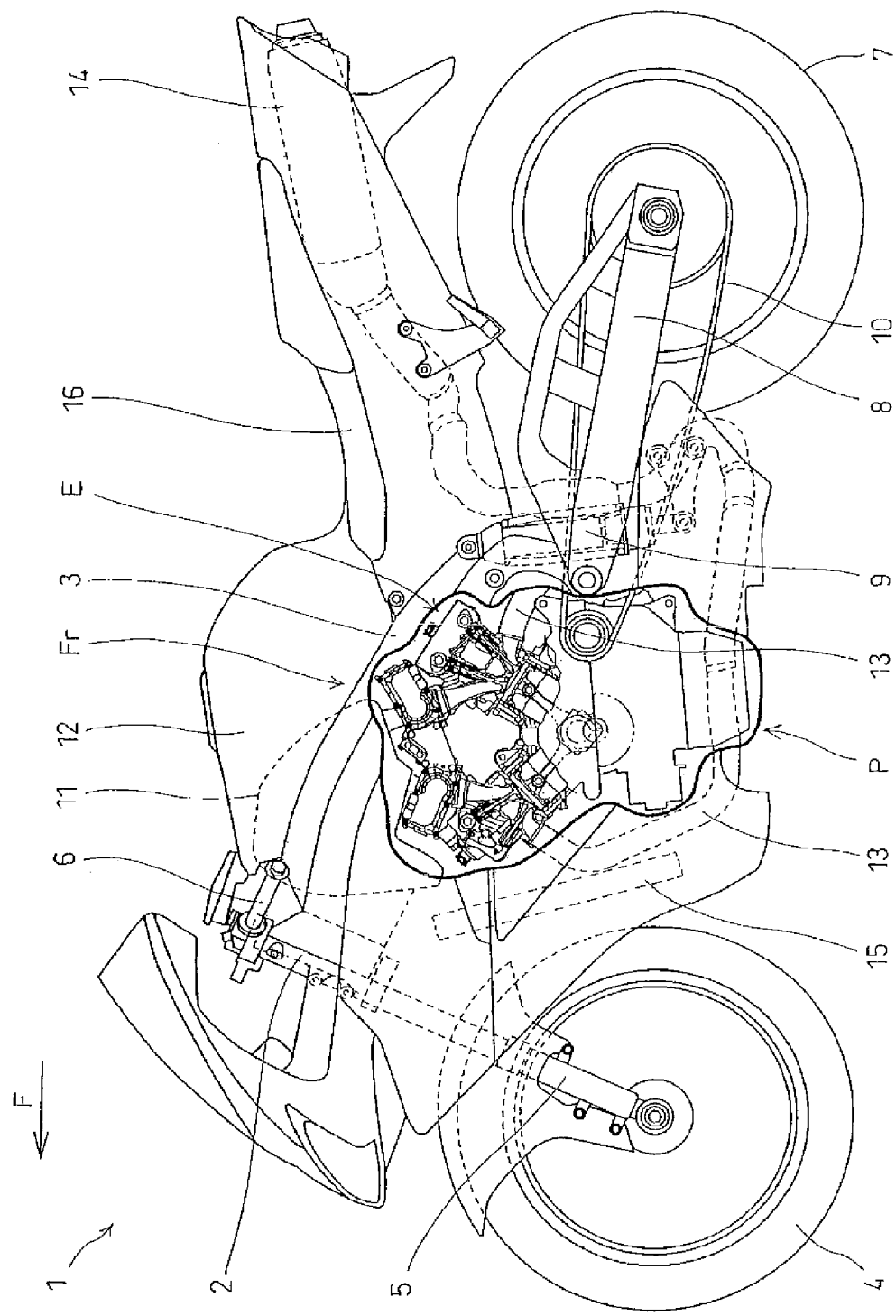
FIG. 1 is a side view of a motorcycle according to a preferred embodiment of the present invention.

FIG. 1 is a side view of a motorcycle 1 according to a preferred embodiment of the present invention. In FIG. 1, the front side of the motorcycle 1 is shown by an arrow F (the same applies to the other drawings). A head pipe 2 is provided at the front end portion of the vehicle. A body frame Fr has a pair of main frames 3 extending rearward from the head pipe 2 so as to be diverged in the lateral direction of the vehicle and inclined downward toward the rear side of the vehicle. A front fork 5 for supporting a front wheel 4 is steerably supported to the head pipe 2, and a steering handle 6 is connected to the upper portion of the front fork 5. A rear fork 8 for supporting a rear wheel 7 is supported to the body frame Fr so as to be swingable in the vertical direction of the vehicle. The rear fork 8 is connected through suspension means 9 to the main frames 3.

A power unit P consisting of a four-cylinder V-type engine E and a transmission is mounted on the body frame Fr. An output shaft of the power unit P is connected through a chain drive mechanism 10 to the rear wheel 7. An air cleaner 11 communicating with intake ports is provided above the engine E, and a fuel tank 12 communicating with fuel injection valves is also provided above the engine E. Exhaust pipes 13 communicating with exhaust ports extend from the front and rear portions of the engine E. These exhaust pipes 13 are joined to be connected to a muffler 14 provided above the rear wheel 7. A radiator 15 is provided before the engine E. A tandem seat 16 is provided on the rear portion of the body frame Fr.

Figure 2:
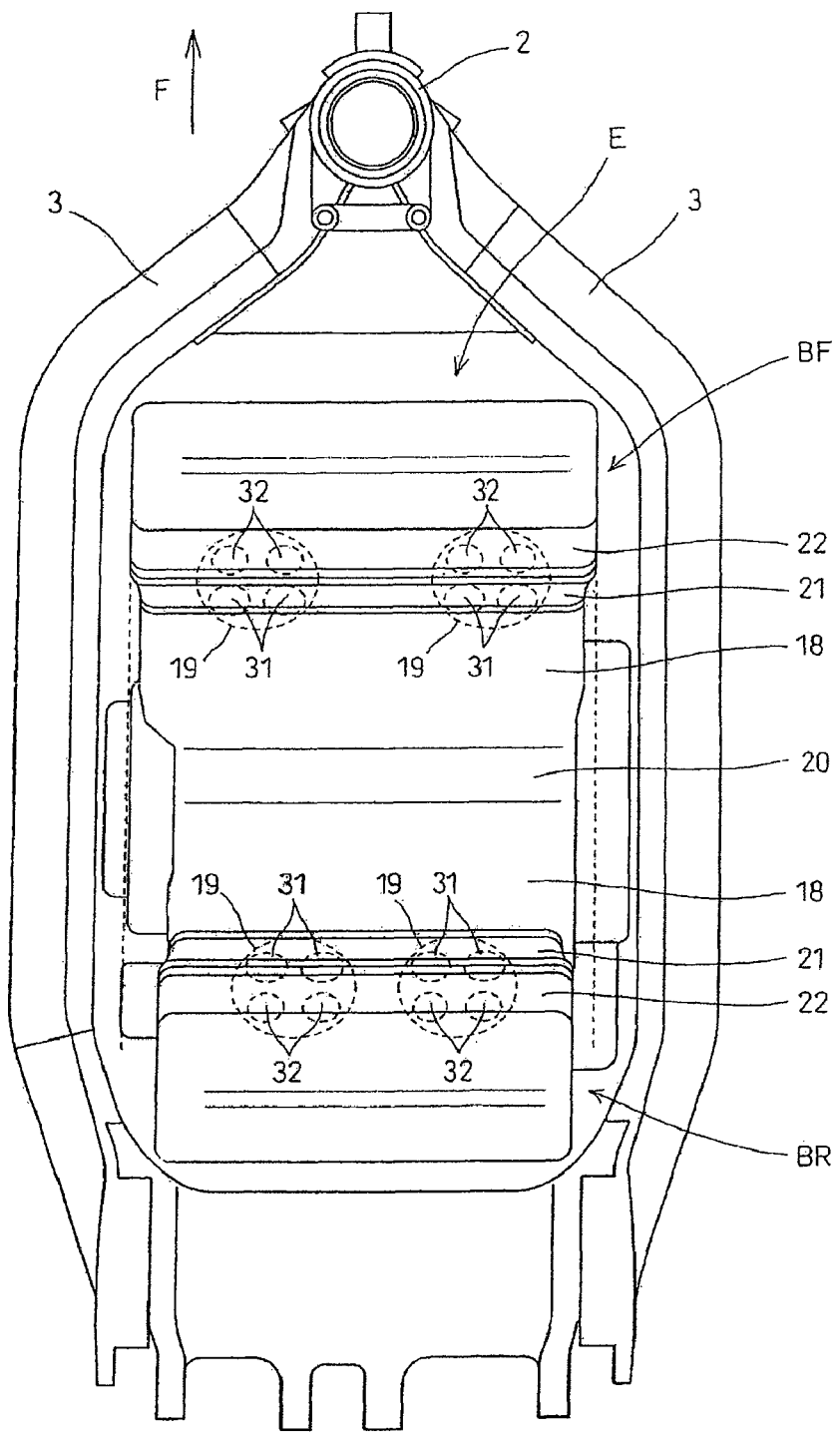
FIG. 2 is a top plan view showing the positional relation between main frames and an engine of the motorcycle shown in FIG. 1.

FIG. 2 is a top plan view showing the positional relation between the main frames 3 and the engine E of the motorcycle 1 shown in FIG. 1. The main frames 3 extend rearward from the head pipe 2 so as to be diverged in the lateral direction of the vehicle and are connected to each other at their rear end portions. The engine E is mounted inside of the main frames 3 as viewed in plan. The engine E is a V-type engine having a front bank BF and a rear bank BR inclined in the longitudinal direction of the vehicle so as to form a V shape.

Each of the front bank BF the rear bank BR a cylinder block 18. Each cylinder block 18 has two cylinders 19 arranged in the lateral direction of the vehicle. Accordingly, the engine E has totally four cylinders 19. The front bank BF and the rear bank BR are connected at their lower portions to a common crankcase 20. A cylinder head 21 and a cylinder head cover 22 are connected to the upper portion of each cylinder block 18.

Figure 3:
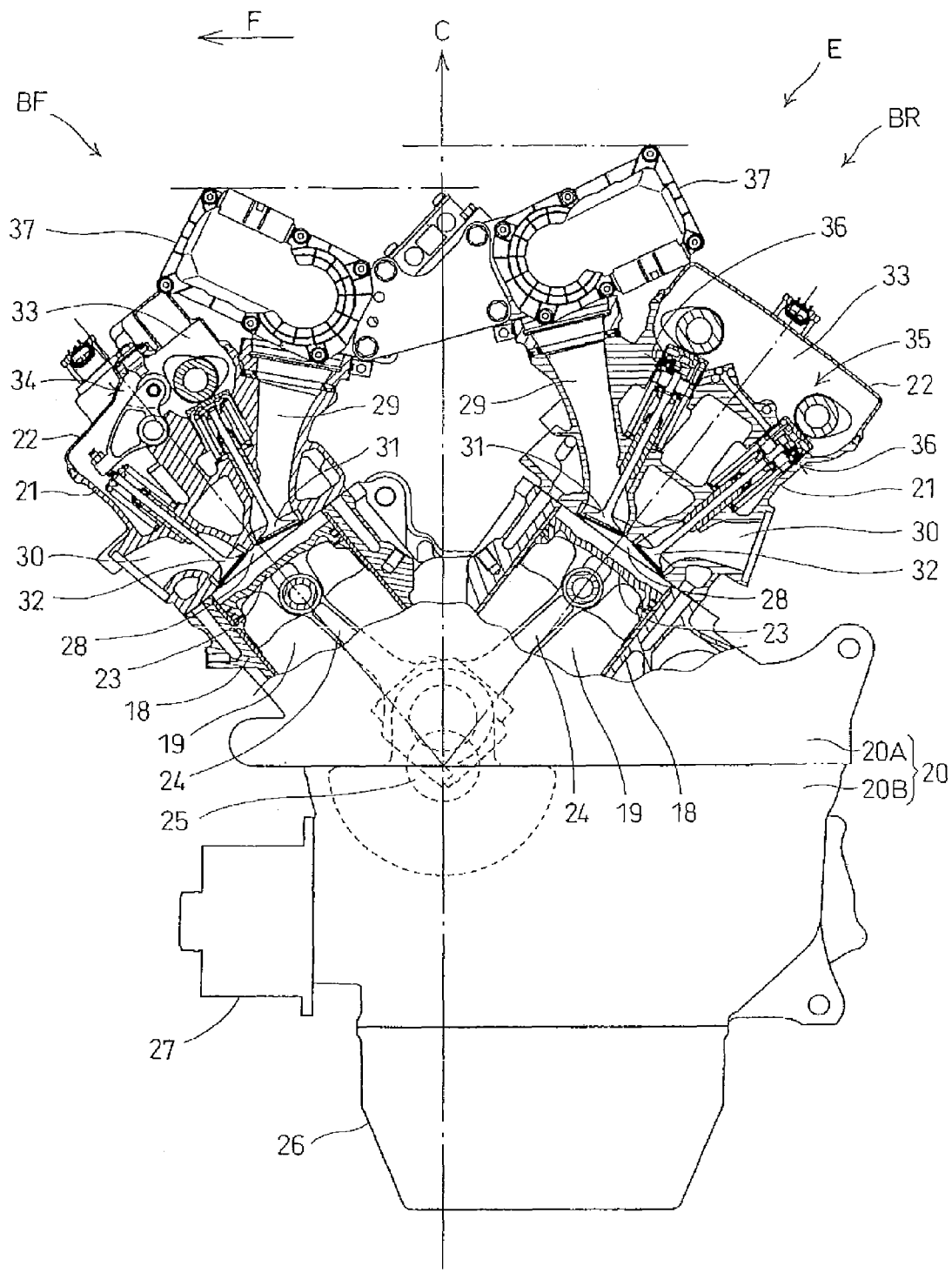
FIG. 3 is a longitudinal sectional view of the engine as viewed from the left side thereof.

FIG. 3 is a longitudinal sectional view of the engine E as viewed from the left side thereof As shown in FIG. 3, the engine E has the front bank BF and the rear bank BR inclined in the longitudinal direction of the vehicle so as to form a V shape, and each of the front bank BF and the rear bank BR has the cylinder block 18. Each cylinder block 18 has the two cylinders 19 (see FIG. 2) arranged in the lateral direction of the vehicle. Further, the cylinder head 21 and the cylinder head cover 22 are connected to the upper portion of each cylinder block 18. A piston 23 is slidably fitted in each cylinder 19 in the front bank BF and the rear bank BR. The pistons 23 in the front bank BF and the rear bank BR are connected through connecting rods 24 to a common crankshaft 25. The crankcase 20 is composed of an upper crankcase 20A and a lower crankcase 20B. The upper crankcase 20A is integrally formed with the cylinder blocks 18 of the front bank BF and the rear bank BR. An oil pan 26 is connected to the lower portion of the lower crankcase 20B, and an oil cooler 27 is connected to the front portion of the lower crankcase 20B.

A combustion chamber 28 is defined between the cylinder head 21 and each piston 23 in each of the front bank BF and the rear bank BR. That is, the combustion chamber 28 is defined for each cylinder 19. The cylinder head 21 in each bank is formed with two intake ports 29 and two exhaust ports 30, wherein each intake port 29 and each exhaust port 30 communicate with the combustion chamber 28 for each cylinder 19. The intake ports 29 in the front bank BF open to the rear surface of the cylinder head 21 of the front bank BF, and the exhaust ports 30 in the front bank BF open to the front surface of the cylinder head 21 of the front bank BF. On the other hand, the intake ports 29 in the rear bank BR open to the front surface of the cylinder head 21 of the rear bank BR, and the exhaust ports 30 in the rear bank BR open to the rear surface of the cylinder head 21 of the rear bank BR.

The combustion chamber 28 for each cylinder 19 is provided with two intake valves 31 and two exhaust valves 32 (see FIG. 2). A valve operating chamber 33 is defined between the cylinder head 21 and the cylinder head cover 22 of each bank, and a valve operating device for operating the intake valves 31 and the exhaust valves 32 is accommodated in the valve operating chamber 33 in each bank. More specifically, the valve operating chamber 33 in the front bank BF is provided with a unicam type valve operating device 34 for operating the intake valves 31 and the exhaust valves 32 for the two cylinders 19 in the front bank BF. On the other hand, the valve operating chamber 33 in the rear bank BR is provided with a DOHC type valve operating device 35 for operating the intake valves 31 and the exhaust valves 32 for the two cylinders 19 in the rear bank BR and also provided with a plurality of valve stop mechanisms 36 respectively for the intake valves 31 and the exhaust valves 32 in the rear bank BR. A plurality of electric actuators 37 for driving throttle valves (which will be hereinafter described) communicating with the intake ports 29 are provided on the upper portion of the engine E.

Figure 4:
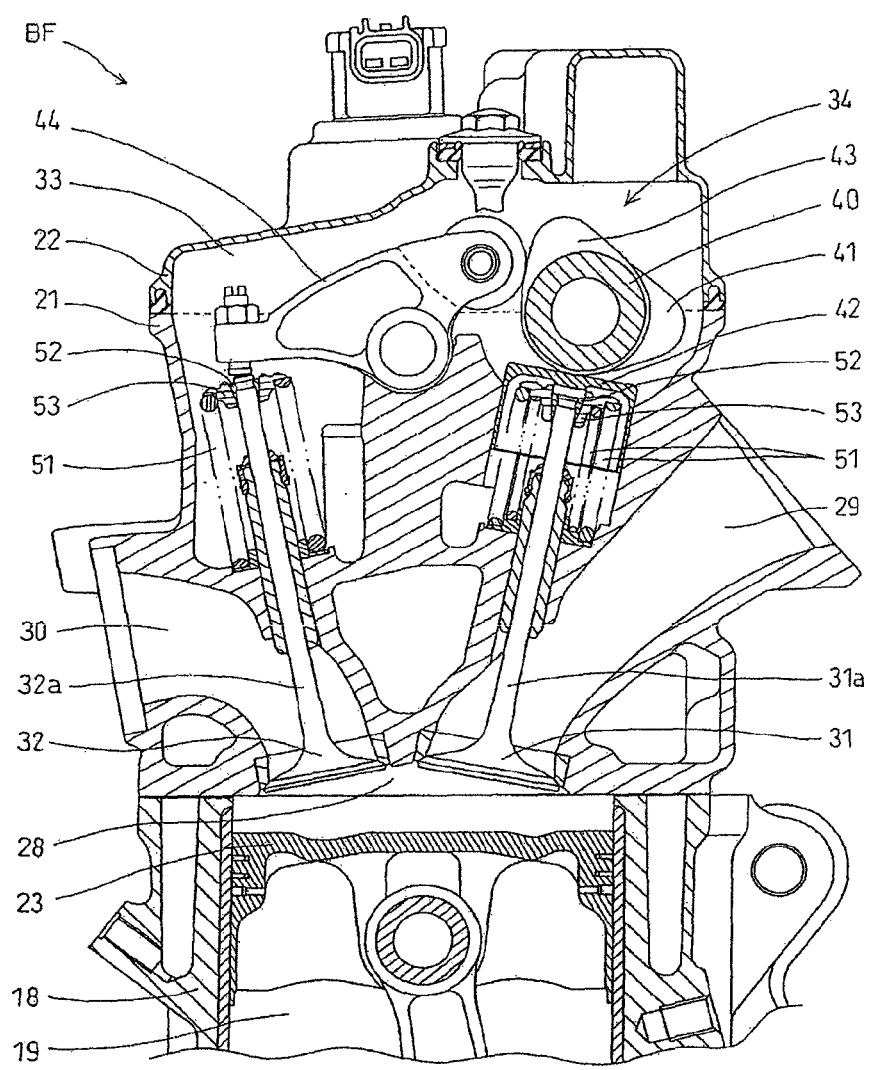
FIG. 4 is an enlarged sectional view of a unicam type valve operating device in the front bank of the engine.

FIG. 4 is an enlarged sectional view of the unicam type valve operating device 34 in the front bank BF of the engine E. The unicam type valve operating device 34 includes a single unicamshaft 40 common to the intake valves 31 and the exhaust valves 32, an intake cam 41 formed on the unicamshaft 40 for operating each intake valve 31, a valve lifter 42 driven by the intake cam 41 to push the top of a valve stem 31a of each intake valve 31, an exhaust cam 43 formed on the unicamshaft 40 for operating each exhaust valve 32, and a rocker arm 44 pivotably driven by the exhaust cam 43 to push the top of a valve stem 32a of each exhaust valve 32.

A pair of valve springs 51 are concentrically provided around the valve stem 31 a of each intake valve 31, and a single valve spring 51 is provided around the valve stem 32a of each exhaust valve 32. The pair of valve springs 51 for each intake valve 31 function to normally bias the valve stem 31a through a cotter 52 and a retainer 53 toward the valve lifter 42. Similarly, the single valve spring 51 for each exhaust valve 32 functions to normally bias the valve stem 32a through a cotter 52 and a retainer 53 toward the rocker arm 44.

The unicamshaft 40 is rotationally driven by the crankshaft 25 (see FIG. 3) through a camshaft driven sprocket and a camshaft drive chain (both not shown) with the rotational speed of the unicamshaft 40 reduced to ½. The valve operating device 34 in the front bank BF is not provided with a valve stop mechanism, so that each cylinder 19 in the front bank BF is always operated during the operation of the engine E.

Figure 5:
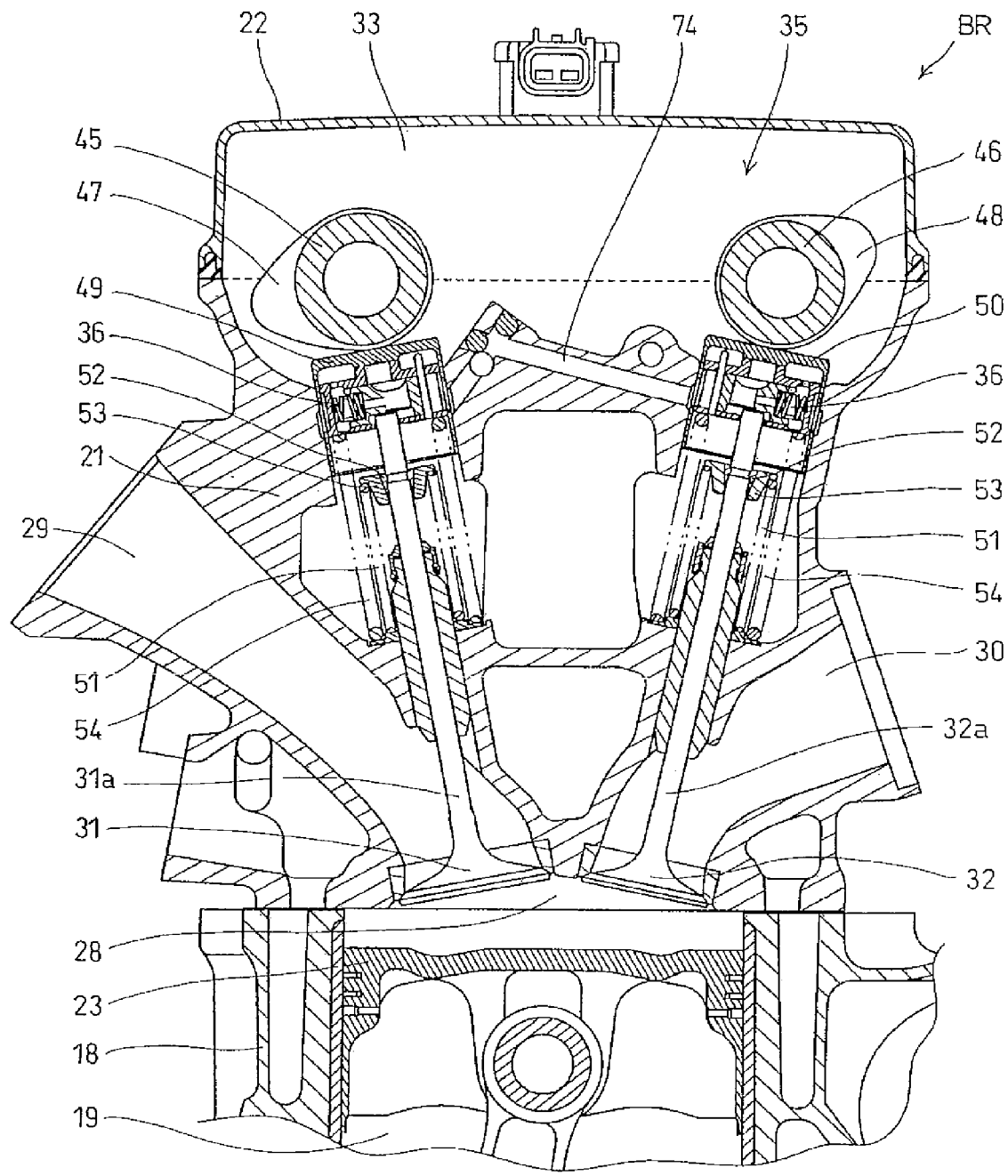
FIG. 5 is an enlarged sectional view of a DOHC type valve operating device in the rear bank of the engine.

FIG. 5 is an enlarged sectional view of the DOHC type valve operating device 35 in the rear bank BR of the engine E. The DOHC type valve operating device 35 includes an intake camshaft 45 provided for the intake valves 31, an exhaust camshaft 46 provided for the exhaust valves 32, an intake cam 47 formed on the intake camshaft 45 for operating each intake valve 31, an exhaust cam 48 formed on the exhaust camshaft 46 for operating each exhaust valve 32, an intake valve lifter 49 driven by the intake cam 47 to push the top of a valve stem 31 a of each intake valve 31, and an exhaust valve lifter 50 driven by the exhaust cam 48 to push the top of a valve stem 32a of each exhaust valve 32.

A valve spring 51 is provided around the valve stem 31a of each intake valve 31. Similarly, a valve spring 51 is provided around the valve stem 32a of each exhaust valve 32. The valve spring 51 for each intake valve 31 functions to normally bias the valve stem 31a through a cotter 52 and a retainer 53 toward the intake valve lifter 49. Similarly, the valve spring 51 for each exhaust valve 32 functions to normally bias the valve stem 32a through a cotter 52 and a retainer 53 toward the exhaust valve lifter 50. A support spring 54 is provided around the valve spring 51 for each intake valve 31 to normally bias the intake valve lifter 49 toward the intake camshaft 45. Similarly, a support spring 54 is provided around the valve spring 51 for each exhaust valve 32 to normally bias the exhaust valve lifter 50 toward the exhaust camshaft 46. Each support spring 54 will be hereinafter described in more detail. The intake valve lifter 49 is provided with the valve stop mechanism 36 for stopping the operation of each intake valve 31. Similarly, the exhaust valve lifter 50 is also provided with the valve stop mechanism 36 for stopping the operation of each exhaust valve 32. The intake camshaft 45 and the exhaust camshaft 46 in the rear bank BR are rotationally driven by the crankshaft 25 (see FIG. 3) through intake and exhaust camshaft driven sprockets and a camshaft drive chain (both not shown) with the rotational speed of the camshafts 45 and 46 reduced to ½.

The valve stop mechanism 36 for each intake valve 31 functions to switch between an operating mode where a valve driving force transmitted from the intake cam 47 to the intake valve lifter 49 is transmitted to the intake valve 31 and a nonoperating mode where the valve driving force is not transmitted to the intake valve 31. Similarly, the valve stop mechanism 36 for each exhaust valve 32 functions to switch between an operating mode where a valve driving force transmitted from the exhaust cam 48 to the exhaust cam lifter 50 is transmitted to the exhaust valve 32 and a nonoperating mode where the valve driving force is not transmitted to the exhaust valve 32. These valve stop mechanisms 36 are controlled by a hydraulic fluid in a hydraulic control system to maintain the closed condition of the valves 31 and 32 by not transmitting the reciprocating motion of the valve lifters 49 and 50 to the valves 31 and 32 in a low-speed operational condition or low-load operational condition of the vehicle. The valve stop mechanisms 36 for each intake valve 31 and each exhaust valve 32 have the same structure, so the valve stop mechanism 36 for each exhaust valve 32 only will now be described in detail.

Figure 6:
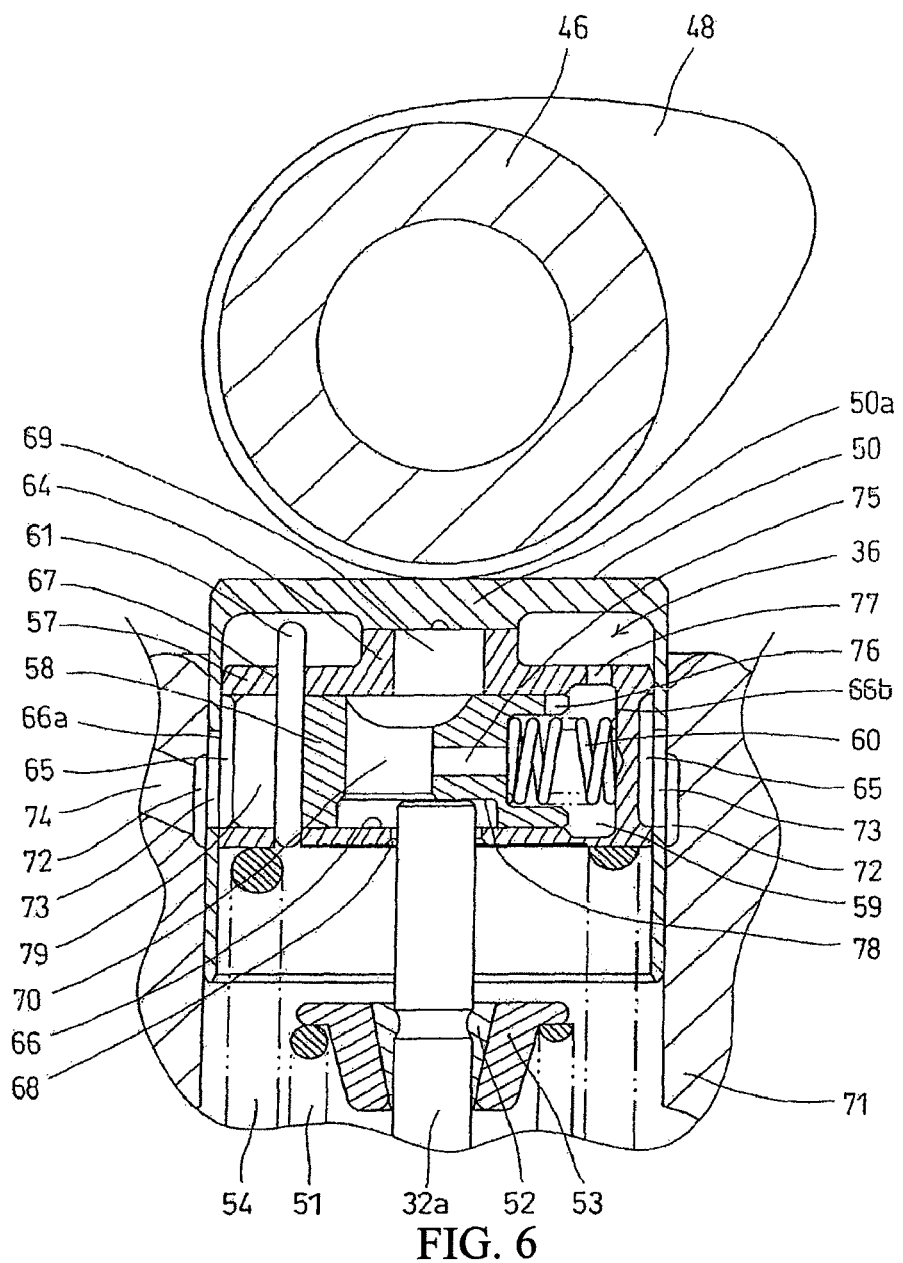
FIG. 6 is an enlarged view of a valve stop mechanism and a valve lifter associated therewith in the rear bank.

FIG. 6 is an enlarged view of the valve stop mechanism 36 for each exhaust valve 32 and the exhaust valve lifter 50 associated with this valve stop mechanism 36. The valve stop mechanism 36 includes a cylindrical holder 57 fitted in the valve lifter 50 so as to be slidable in the axial direction of the valve stem 32a, a slide pin 58 fitted in the holder 57 so as to be slidable in a direction perpendicular to the axial direction of the valve stem 32a, a coil spring 60 accommodated in a coil spring chamber 59 defined between the holder 57 and the slide pin 58, and a stopper pin 61 provided in the holder 57.

Figure 7:
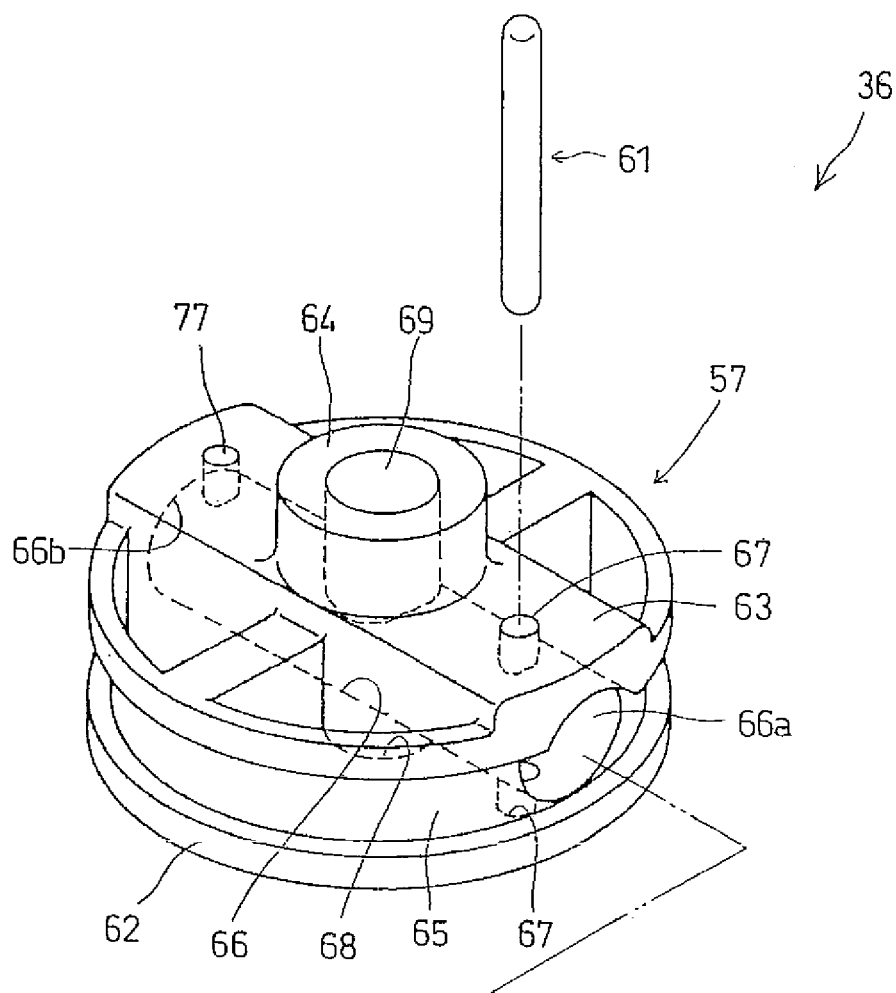
FIG. 7 is an exploded perspective view of the valve stop mechanism shown in FIG. 6.
Figure 7:
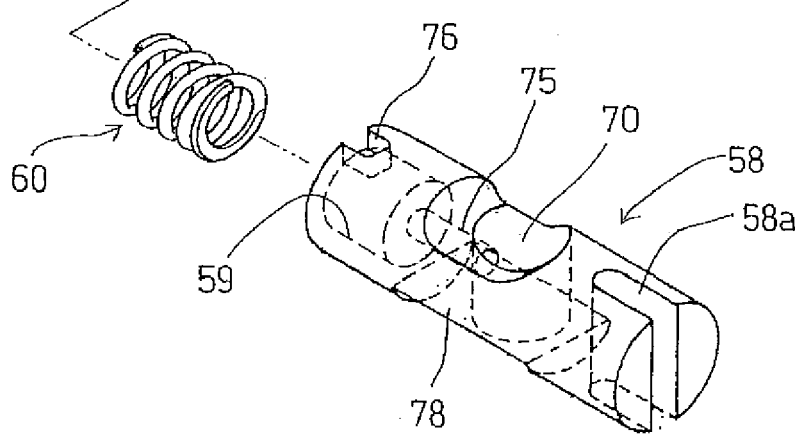

FIG. 7 is an exploded perspective view of the valve stop mechanism 36. The holder 57 is an integral member composed of a ring portion 62, a connecting portion 63 for connecting the diametrically opposite portions of the ring portion 62, and an abutting portion 64 projecting upward from the center of the connecting portion 63 to come into abutment against the inner surface of a top wall 50a of the valve lifter 50 (see FIG. 6). The outer circumferential surface of the ring portion 62 is formed with an inner annular oil passage 65. The connecting portion 63 of the holder 57 is formed with a slide pin accommodating hole 66 extending in the direction perpendicular to the axial direction of the valve stem 32a. The slide pin accommodating hole 66 has an open end 66a and a closed end 66b. The coil spring 60 and the slide pin 58 are accommodated into the slide pin accommodating hole 66 from the open end 66a. In this accommodated condition, the stopper pin 61 is inserted through a slit 58a of the slide pin 58 and engaged with a pair of upper and lower stopper pin engaging holes 67 formed through the upper and lower walls of the connecting portion 63.

As shown in FIG. 6, the lower wall of the connecting portion 63 is formed with a lower through hole 68 for insertion of the upper end portion of the valve stem 32a. The abutting portion 64 is formed with an upper through hole 69 coaxial with the lower through hole 68, wherein the upper end portion of the valve stem 32a is adapted to be inserted into the upper through hole 69. Further, the slide pin 58 is formed at its central portion with a valve stem insertion hole 70 having an axis parallel to the axis of the valve stem 32a. As described later, when oil pressure is applied from the open end 66a of the valve stop mechanism 36 to one end of the slide pin 58, the slide pin 58 is moved in the slide pin accommodating hole 66 to bring the lower through hole 68, the valve stem insertion hole 70, and the upper through hole 69 into alignment with each other.

The valve spring 51 is provided around the valve stem 32a to upwardly bias the valve stem 32a through the cotter 52 and the retainer 53. The support spring 54 is provided around the valve spring 51 to upwardly bias the holder 57, thereby upwardly biasing the valve lifter 50 so that the abutting portion 64 abuts against the inner surface of the top wall 50a of the valve lifter 50 and the outer surface of the top wall 50a abuts against the cam 48. The cylinder head 21 is formed with a lifter support portion 71 for supporting the valve lifter 50. The inner circumferential surface of the lifter support portion 71 is formed with an outer annular oil passage 72, and the cylindrical wall of the valve lifter 50 is formed with lifter through holes 73. The outer annular oil passage 72 communicates with the inner annular oil passage 65 through the lifter through holes 73. The cylinder head 21 is formed with an oil pressure supply passage 74 (see also FIG. 5) communicating with the outer annular oil passage 72. Oil pressure is supplied from the oil pressure supply passage 74 through the outer annular oil passage 72, the lifter through holes 73, and the inner annular oil passage 65 to an oil pressure chamber 79 defined between the open end 66a of the slide pin accommodating hole 66 and the slitted end of the slide pin 58 (i.e., defined by the end space near the open end 66a and the slit 58a of the slide pin 58). Whether or not the oil pressure is applied to the valve stop mechanism 36 is selected according to purposes. When the oil pressure is applied, the slide pin 58 is pushed to compress the coil spring 60. The slide pin 58 is formed with a communication hole 75 between the valve stem insertion hole 70 and the coil spring chamber 59 and further formed with a recess 76 at the other end of the slide pin 58 exposed to the coil spring chamber 59. Further, the holder 57 is formed with an air vent 77 near the closed end 66b of the slide pin accommodating hole 66. The air vent 77 communicates with the coil spring chamber 59. Accordingly, air ventilation can be provided through the communication hole 75, the recess 76, and the air vent 77, so that a pressure change in the coil spring chamber 59 due to the movement of the slide pin 58 can be eliminated. Further, a sliding surface of the slide pin 58 and a contact portion of the coil spring 60 can be lubricated by a lubricating oil mist mixed in the ventilated air.

FIG. 6 shows a condition where no oil pressure is applied to the oil pressure chamber 79 formed between the open end 66a of the hole 66 and the slitted end of the slide pin 58. In this condition, the coil spring 60 is not compressed and the slide pin 58 abuts against the stopper pin 61. The abutting portion 64 of the holder 57 is kept in abutment against the inner surface of the top wall 50a of the valve lifter 50 by the support spring 54, so that the outer surface of the top wall 50a of the valve lifter 50 is kept in abutment against the cam 48. The valve stem 32a is upward biased by the valve spring 51 through the cotter 52 and the retainer 53, so that the upper end of the valve stem 32a is kept in abutment against a recessed portion 78 formed at the lower portion of the slide pin 58. When the cam 48 is rotated in this condition, the valve lifter 50 and the valve stem 32a are vertically reciprocated together, thereby opening and closing the valve 32. In other words, the valve 32 is in the operating condition, and the cylinder 19 is in the operating condition.

Figure 8:
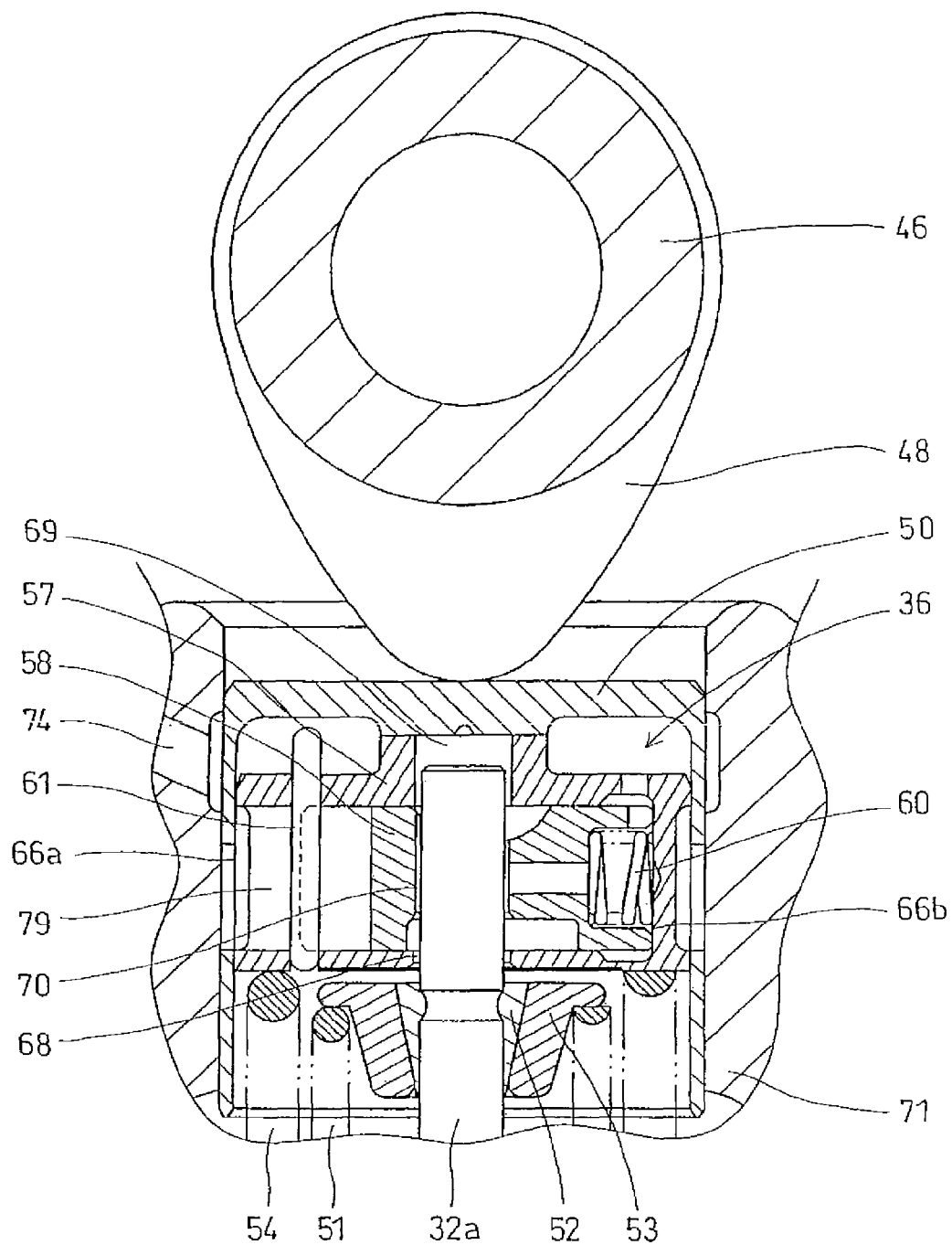
FIG. 8 is an enlarged view similar to FIG. 6, showing a valve stop condition.

FIG. 8 shows a condition where oil pressure is applied to the oil pressure chamber 79. In FIG. 8, there is shown an instant when the valve lifter 50 is pushed down by the cam 48. In this condition, the slide pin 58 is pushed by the oil pressure applied to the oil pressure chamber 79 against the biasing force of the coil spring 50, so that the slide pin 58 is moved rightward as viewed in FIG. 8. As a result, the valve stem insertion hole 70 of the slide pin 58 is aligned to the valve stem 32a, so that the valve stem 32a biased upward by the valve spring 51 can be inserted into the valve stem insertion hole 70 and the upper through hole 69 in this condition. Since the valve stem 32a is normally biased upward by the valve spring 51, the valve 32 remains closed. Since the holder 57 and the slide pin 58 are normally biased upward by the support spring 54, the valve lifter 50 is kept in abutment against the cam 48. When the cam 48 is rotated in this condition, the valve lifter 50, the holder 57, and the slide pin 58 are vertically reciprocated together. However, the upper end portion of the valve stem 32a is loosely inserted in the lower through hole 68, the valve stem insertion hole 70, and the upper through hole 69 aligned with each other, so that the valve 32 remains closed irrespective of the reciprocation of the valve lifter 50. In other words, the valve 32 is in the nonoperating condition, and the cylinder 19 is in the nonoperating condition. While the valve stop mechanism 36 for each exhaust valve lifter 50 has been described, the valve stop mechanism 36 for each intake valve lifter 49 is similar in structure and function to that for each exhaust valve lifter 50.

Figure 9:
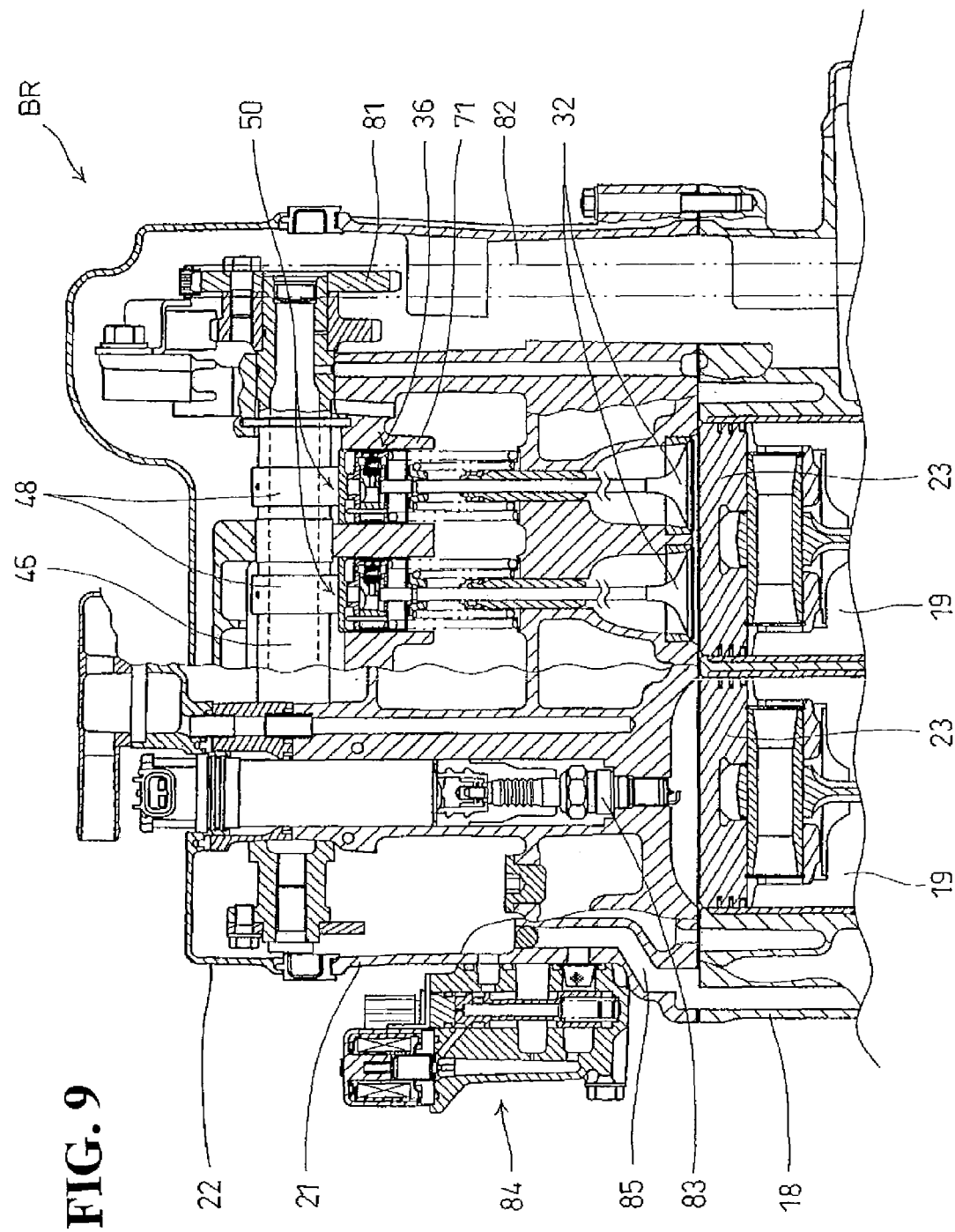
FIG. 9 is a lateral sectional view of the upper portion of the rear bank as viewed from the rear side thereof.

FIG. 9 is a lateral sectional view of the upper portion of the rear bank BR as viewed from the rear side thereof. The exhaust valves 32 in the rear bank BR are shown in FIG. 9. The cylinder block 18, the cylinder head 21, and the cylinder head cover 22 are arranged in this order from the lower side in FIG. 9. The two cylinders 19 in the rear bank BR are juxtaposed in the lateral direction of the vehicle. The exhaust camshaft 46 is supported between the cylinder head cover 22 and the cylinder head 21. A camshaft driven sprocket 81 is mounted on the exhaust camshaft 46 at its right end as viewed in FIG. 9. The camshaft driven sprocket 81 is driven by the crankshaft 25 through a camshaft drive chain 82. Each cylinder 19 is provided with the two exhaust valves 32, and the two valve lifters 50 are respectively provided at the upper end portions of the two exhaust valves 32 for each cylinder 19. The two exhaust cams 48 are respectively kept in abutment against the upper surfaces of the two valve lifters 50 for each cylinder 19. Each valve lifter 50 is slidably supported to the lifter support portion 71. Although not shown in FIG. 9, the intake camshaft 45, the intake cams 47, the intake valves 31, the intake valve lifters 49, the intake camshaft driven sprocket 81, and the drive chain 82 are similarly provided.

A single spark plug 83 is provided for each combustion chamber 28 so as to be exposed to a central portion thereof In each combustion chamber 28, the two intake valves 31 and the two exhaust valves 32, or the totally four engine valves are arranged around the spark plug 83 (see FIG. 2). Each of the two cylinders 19 in the rear bank BR is a cylinder with "cylinder stop mechanism". More specifically, the four valve lifters 49 and 50 for the four engine valves 31 and 32 for each cylinder 19 in the rear bank BR are respectively provided with the four valve stop mechanisms 36. Oil pressure is applied to all the four valve stop mechanisms 36 for each cylinder 19 at the same time from the oil pressure supply passage 74 (see FIG. 5). When this oil pressure applied to all the four valve stop mechanisms 36 for each cylinder 19 is high, all the four valve stop mechanisms 36 for each cylinder 19 are simultaneously operated to stop the operation of all the four engine valves 31 and 32 for each cylinder 19, thus stopping the operation of each cylinder 19. The term of "cylinder stop mechanism" means the integration of the four valve stop mechanisms 36 for each cylinder 19.

A single hydraulic control valve 84 is provided on the left side surface of the cylinder head 21 of the rear bank BR. The hydraulic control valve 84 functions to control the oil pressure to be supplied to the cylinder stop mechanisms 36 for the two cylinders 19 in the rear bank BR. In other words, the hydraulic control valve 84 functions to switch between the connection and disconnection of a hydraulic fluid supply passage 85 and a hydraulic fluid discharge passage 86 (see FIG. 10) formed in a side portion of the cylinder head 21. The hydraulic fluid discharge passage 86 is connected to the oil pressure supply passage 74 (see FIG. 5) branched near each cylinder 19, so that the hydraulic fluid discharged from the hydraulic control valve 84 is supplied to all the four valve stop mechanisms 36 for each cylinder 19 at the same time.

Figure 10:
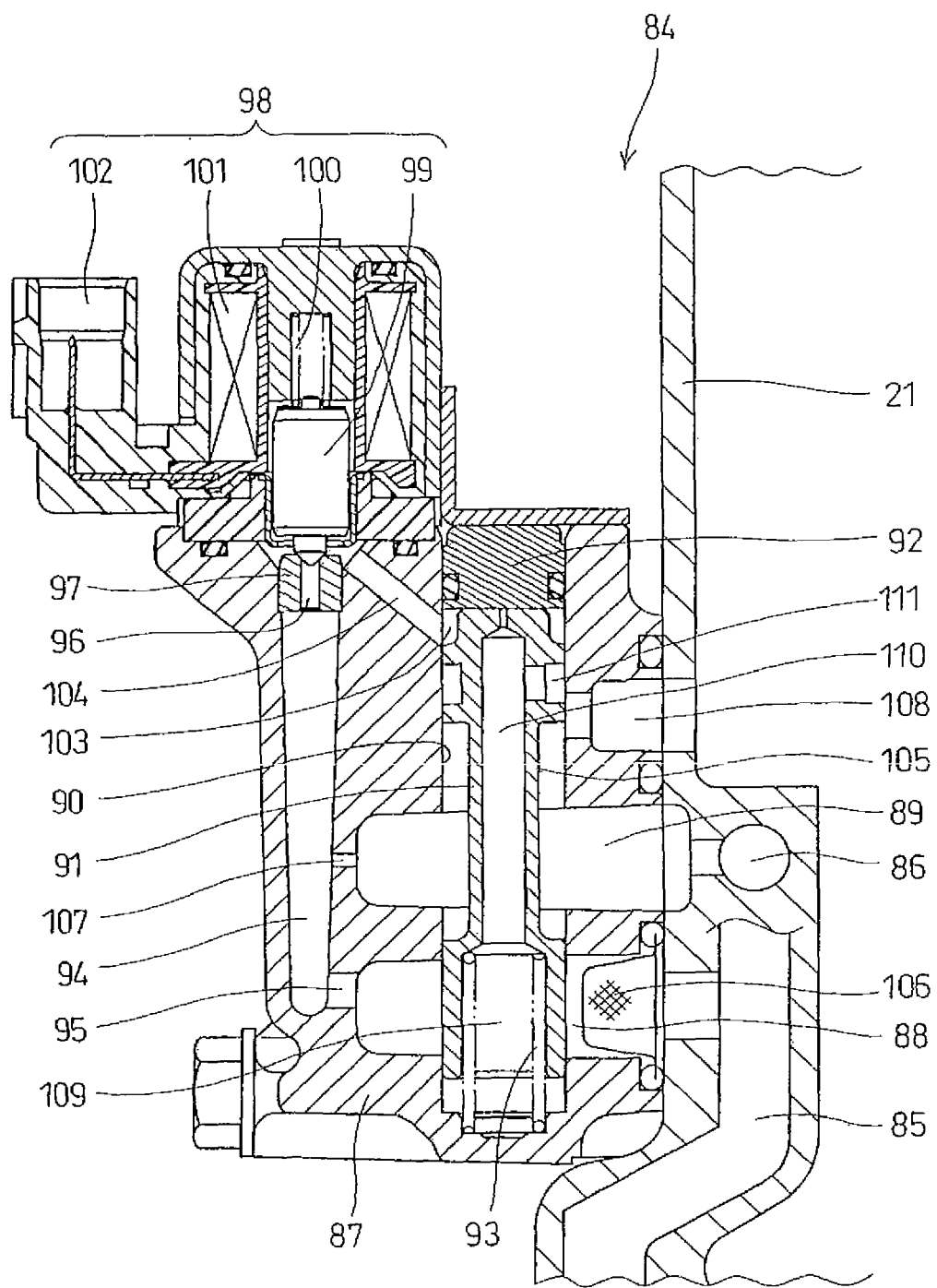
FIG. 10 is a sectional view of a hydraulic control valve.

FIG. 10 is a sectional view of the hydraulic control valve 84. The hydraulic control valve 84 functions to control whether or not oil pressure is to be applied to each valve stop mechanism 36. The hydraulic control valve 84 has a housing 87. The housing 87 is formed with an inlet port 88 communicating with the hydraulic fluid supply passage 85 and further formed with an outlet port 89 communicating with the hydraulic fluid discharge passage 86. Further, a valve body accommodating hole 90 is formed at a central portion of the housing 87. The valve body accommodating hole 90 is closed at one end thereof and open at the other end. A spool valve body 91 is slidably fitted in the valve body accommodating hole 90, and the open end of the valve body accommodating hole 90 is closed by a cap 92. A first coil spring 93 to normally bias the spool valve body 91 toward the cap 92 is provided at the closed end of the valve body accommodating hole 90. A communication passage 94 is also formed in the housing 87 so as to extend parallel to the valve body accommodating hole 90. The communication passage 94 communicates at one end thereof with the inlet port 88 through a communication hole 95. The other end of the communication passage 94 communicates with an electromagnetic on-off valve 98 through a valve seat 97 having a communication hole 96 at the center thereof. The electromagnetic on-off valve 98 includes a solenoid valve body 99, a second coil spring 100, a solenoid coil 101, and a power supply connecting portion 102. The second coil spring 100 functions to normally bias the solenoid valve body 99 in a direction of closing the communication hole 96.

A pilot oil chamber 103 is defined between the spool valve body 91 and the cap 92, and a pressurizing passage 104 is formed in the housing 87 so as to connect the pilot oil chamber 103 and the communication hole 96. The central portion of the spool valve body 91 is reduced in outer diameter to form a small-diameter portion 105. An oil filter 106 is interposed between the hydraulic fluid supply passage 85 and the inlet port 88. The housing 87 is further formed with an orifice 107 for connecting the communication passage 94 and the outlet port 89. Even when the spool valve body 91 is in its closed position, the inlet port 88 and the outlet port 89 are in communication with each other through the communication hole 95, the communication passage 94, and the orifice 107, so that a low oil pressure restricted by the orifice 107 is always supplied to the hydraulic fluid discharge passage 86. The housing 87 is further formed with a relief port 108 opening into the cylinder head 21. When the spool valve body 91 is in the closed position where the inlet port 88 is shut off, the relief port 108 communicates with the outlet port 89 through the annular space defined between the small-diameter portion 105 of the spool valve body 91 and the inner surface of the valve body accommodating hole 90, so that the oil pressure in the hydraulic fluid discharge passage 86 is relieved to the inside space of the cylinder head 21. The first coil spring accommodating portion 109 is always in communication with the relief port 108 through the central hole 110 and the pressure control hole 111. Accordingly, a pressure change in the first coil spring accommodating portion 109 due to the movement of the spool valve body 91 can be prevented.

When the electromagnetic on-off valve 98 in the hydraulic control valve 84 is operated to open the solenoid valve body 99, the oil pressure in the hydraulic fluid supply passage 85 is supplied through the inlet port 88, the communication hole 95, the communication passage 94, the communication hole 96, and the pressurizing passage 104 to the pilot oil chamber 103, so that the spool valve body 91 is moved in a direction of compressing the first coil spring 93. As a result, the inlet port 88 is brought into communication with the outlet port 89 through the space around the small-diameter portion 105 of the spool valve body 91, and the communication between the outlet port 89 and the relief port 108 is shut off. Thus, the inlet port 88 comes into communication with the outlet port 89, so that the hydraulic fluid in the hydraulic fluid supply passage 85 is discharged from the outlet port 89 and then supplied under a high pressure through the hydraulic fluid discharge passage 86 and the oil pressure supply passage 74 (see FIG. 5) to the oil pressure chamber 79 (see FIG. 8) of each valve stop mechanism 36. Accordingly, the intake valves 31 and the exhaust valves 32 in each cylinder 19 in the rear bank BR are kept closed by the respective valve stop mechanisms 36.

When the electromagnetic on-off valve 98 in the hydraulic control valve 84 is operated to close the solenoid valve body 99, the spool valve body 91 is pushed by the first coil spring 93 to restore the original position. As a result, the communication between the inlet port 88 and the outlet port 89 is shut off and the outlet port 89 is brought into communication with the relief port 108. Accordingly, the oil pressure in the oil pressure chamber 79 in each valve stop mechanism 36 is relieved through the oil pressure supply passage 74 (see FIG. 5) and the hydraulic fluid discharge passage 86. As a result, the slide pin 58 in each valve stop mechanism 36 is moved by the biasing force of the coil spring 60 to the original position where the slide pin 58 abuts against the stopper pin 61 (see FIG. 6). Accordingly, the valve stems 31a and 32a in each cylinder 19 abut against the recessed portions 78 of the respective slide pins 58, so that the intake valves 31 and the exhaust valves 32 in each cylinder 19 are normally opened and closed in response to the rotation of the cams 47 and 48.

Figure 11:
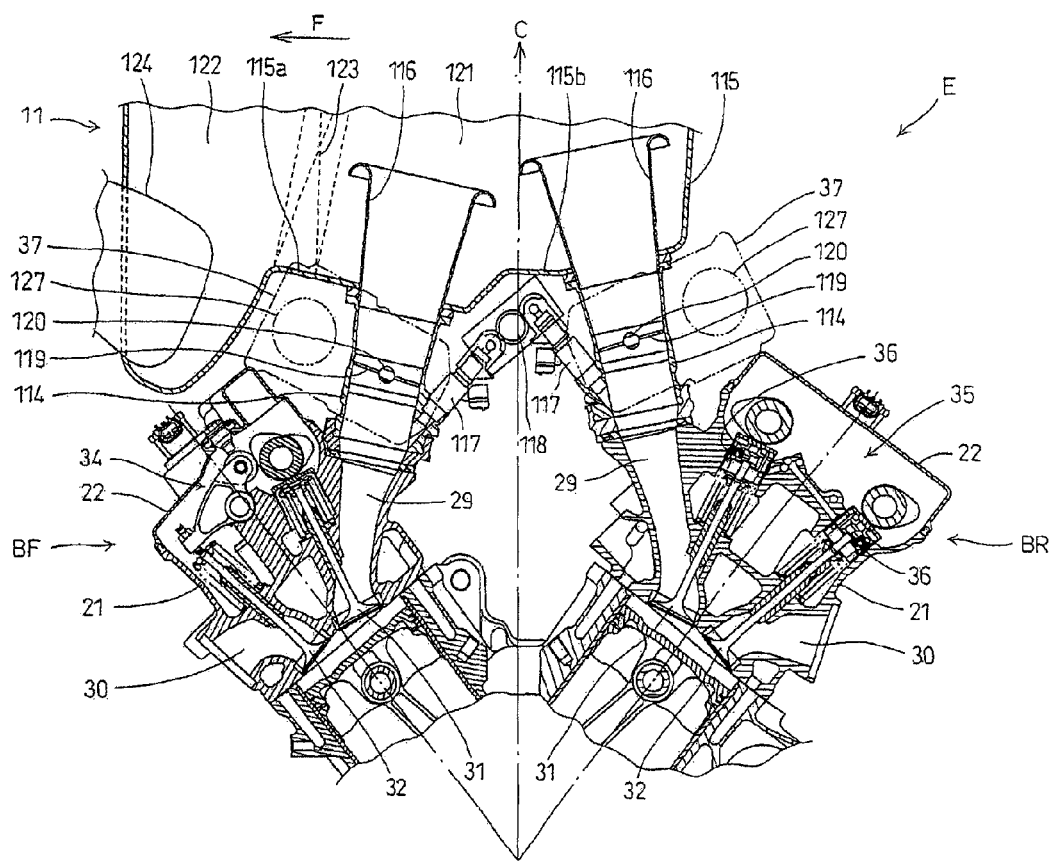
FIG. 11 is a longitudinal sectional view showing throttle bodies and their associated parts provided on the upper side of the engine.

FIG. 11 is a longitudinal sectional view showing throttle bodies 114 and their associated parts provided on the upper side of the engine E as viewed from the left side of the vehicle. In FIG. 1, a lower half portion of the air cleaner 11 shown in FIG. 1 is shown in detail. The throttle bodies 114 are respectively connected to the intake ports 29 formed in the front bank BF and the rear bank BR. The air cleaner 11 has an air cleaner case 115, which is provided with funnel-shaped intake pies 116. The lower ends of the funnel-shaped intake pipes 116 are respectively connected to the upper ends of the throttle bodies 114. Fuel injection valves 117 are mounted on the opposed side surfaces of the throttle bodies 114 so as to be located in the space between the front bank BF and the rear bank BR. The upper ends of the fuel injection valves 117 are connected to a common fuel supply pipe 118. Throttle valves 119 are respectively provided in the throttle bodies 114 so as to be supported by rotatable throttle shafts 120. The throttle shafts 120 are rotationally driven by the electric actuators 37. The inside space of the air cleaner 11 is partitioned into a clean space 121 on the rear side and a dust space 122 on the front side by a cleaner element 123. The funnel-shaped intake pipes 116 are open to the clean space 121. A pair of right and left air intake ducts 124 are connected at their downstream ends to the right and left side portions of the dust space 122. The upstream ends of the air intake ducts 124 open to the front side of the vehicle.

Figure 12:
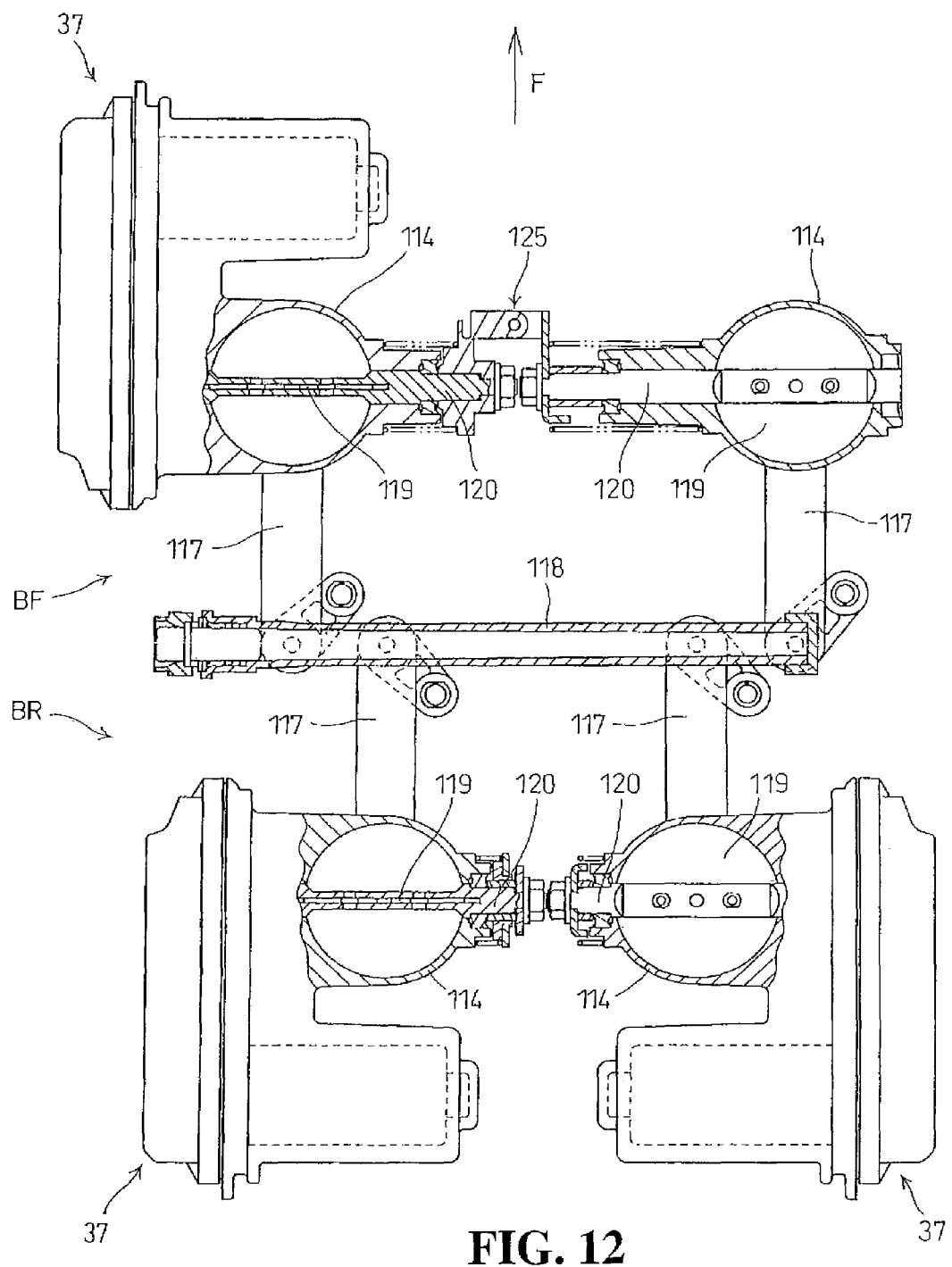
FIG. 12 is a horizontal sectional view of the throttle bodies as viewed from the upper side thereof.

FIG. 12 is a horizontal sectional view of the throttle bodies 114 as viewed from the upper side thereof. The two throttle bodies 114 shown in the upper half of FIG. 12 are those for the front bank BF, and the other two throttle bodies 114 shown in the lower half of FIG. 12 are those for the rear bank BR. The single fuel supply pipe 118 is located between the throttle bodies 114 for the front bank BF and the throttle bodies 114 for the rear bank BR so as to extend in the lateral direction of the vehicle. The fuel injection valves 117 for the front bank BF are provided between the fuel supply pipe 118 and the throttle bodies 114 for the front bank BF, and the fuel injection valves 117 for the rear bank BR are provided between the fuel supply pipe 118 and the throttle bodies 114 for the rear bank BR. Fuel is supplied from the fuel supply pipe 118 to all the fuel injection valves 117 and is injected from the fuel injection valves 117 toward the respective intake ports 29 (see FIG. 11).

In the front bank BF, the right and left throttle shafts 120 for the right and left throttle bodies 114 are connected to each other by a central connecting portion 125. The electric actuator 37 for commonly driving the right and left throttle valves 119 in the front bank BF is provided on the left side of the left throttle body 114, so that the right and left throttle valves 119 are operated together through the connecting portion 125 by the common electric actuator 37 in the front bank BF.

In the rear bank BR, the right and left throttle shafts 120 for the right and left throttle bodies 114 are supported so as to be rotated independently of each other. That is, the electric actuator 37 for driving the left throttle valve 119 in the rear bank BR is provided on the left side of the left throttle body 114, and the electric actuator 37 for driving the right throttle valve 119 in the rear bank BR is provided on the right side of the right throttle body 114. Accordingly, the right and left throttle valves 119 are operated independently of each other by the right and left electric actuators 37 in the rear bank BR, respectively.

Figure 13:
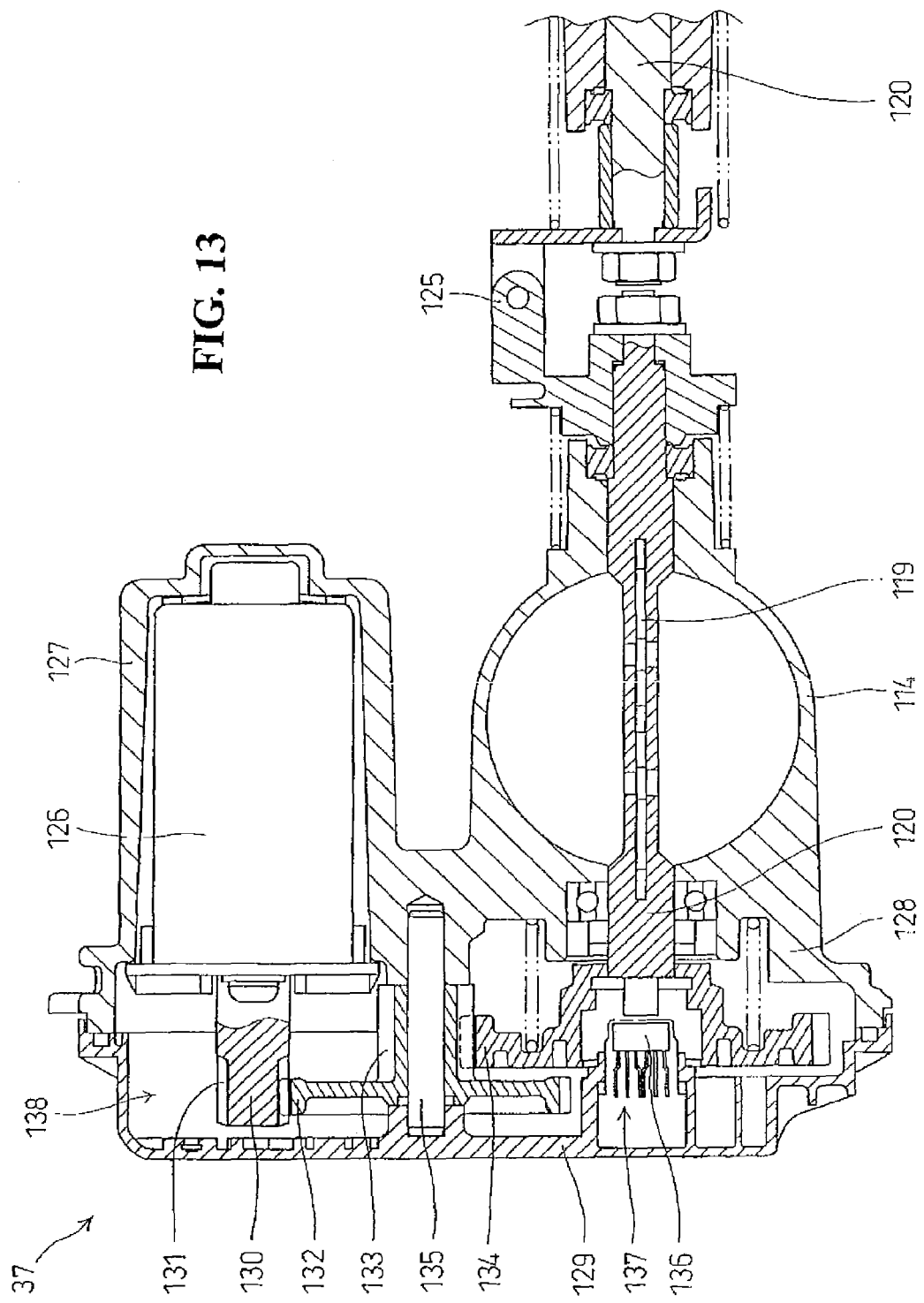
FIG. 13 is a sectional view of a throttle valve driving actuato.
Figure 14:
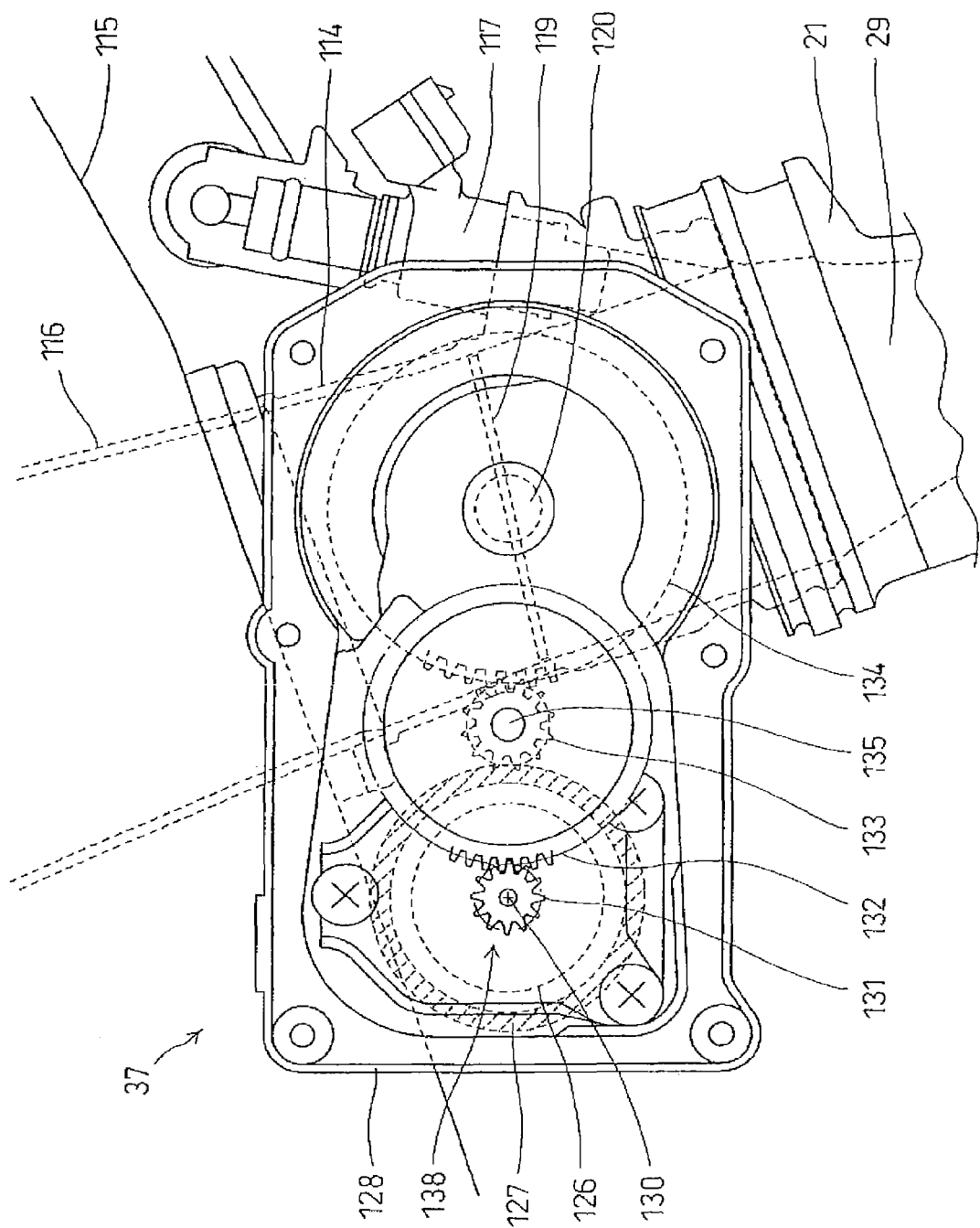
FIG. 14 is an elevational view of the actuator shown in FIG. 13 in the condition where a cover member is removed.

FIG. 13 is a sectional view of the electric actuator 37 for commonly driving the right and left throttle valves 119 in the front bank BF. Since all the electric actuators 37 have the same structure, the electric actuator 37 in the front bank BF is representatively shown in FIG. 13. The actuator 37 includes a throttle driving motor 126, a speed reduction gear train 138, a throttle position sensor 136, and a power supply connecting portion 137. The throttle body 114 is integrally formed with a motor case 127 and a gear train case 128. A separate cover member 129 is mounted on the motor case 127 and the gear train case 128 so as to define a space for accommodating the throttle driving motor 126, the speed reduction gear train 138, the throttle position sensor 136, and the power supply connecting portion 137. FIG. 14 is an elevational view of the actuator 37 shown in FIG. 13 in the condition where the cover member 129 is removed.

As shown in FIGS. 13 and 14, the throttle driving motor 126 is accommodated in the motor case 127 integral with the throttle body 114. A driving force output from the throttle driving motor 126 is transmitted through the speed reduction gear train 138 to the throttle shaft 120. The speed reduction gear train 138 includes a pinion 131 formed on a motor shaft 130, a large-diameter idle gear 132, a small-diameter idle gear 133, and a large-diameter driven gear 134 mounted on the throttle shaft 120. The large-diameter idle gear 132 and the small-diameter idle gear 133 are integrally formed so as to be juxtaposed coaxially. These idle gears 132 and 133 are rotatable about an idle gear shaft 135 supported to the gear train case 128 and the cover member 129. The throttle position sensor 136 and the power supply connecting portion 137 are located opposite to the left end of the throttle shaft 120. Having thus described the configuration of the actuator 37 in the front bank BF, the configuration of each actuator 37 in the rear bank BR is similar to that of the actuator 37 in the front bank BF.

The throttle grip of the steering handle 6 of the motorcycle is provided with a throttle operation sensor (not shown) for detecting an operation amount applied from a rider to the throttle grip. On the other hand, the throttle position sensor 136 is provided in the actuator 37. Further, a throttle control device (not shown) is provided on the vehicle to control the actuator 37 according to the operation amount detected by the throttle operation sensor so that an output from the throttle operation sensor and an output from the throttle position sensor 136 are compared and the difference between these outputs becomes zero. Accordingly, the throttle valve 119 is driven according to the operation amount by the rider.

Referring to FIG. 11, the heights of the front bank BF and the rear bank BR will now be compared, wherein a bank center line C (see also FIG. 3) is defined by the bisector between the cylinder center line in the front bank BF and the cylinder center line in the rear bank BR as shown by the phantom lines. This bank center line C is used as a vertical line. The valve operating device 34 in the front bank BF has no valve stop mechanisms, while the valve operating device 35 in the rear bank BR has the valve stop mechanisms 36. Accordingly, the height of the cylinder head 21 in the front bank BF is lower than that of the cylinder head 21 in the rear bank BR. Accordingly, the mount position of each throttle body 114 to the cylinder head 21 in the front bank BF is lower than that in the rear bank BR. Accordingly, the connection position of the funnel-shaped intake pipe 116 to each throttle body 114 in the front bank BF is lower than that in the rear bank BR. Since the position of each throttle body 114 in the front bank BF is lower than that in the rear bank BR, the position of the actuator 37 in the front bank BF and the position of the motor case 127 of this actuator 37 are lower than those in the rear bank BR. Furthermore, the valve operating device 34 in the front bank BF is of a unicam type, while the valve operating device 35 in the rear bank BR is of a DOHC type. Accordingly, the height of the cylinder head cover 22 in the front bank BF is lower than that in the rear bank BR, so that the height of the actuator 37 in the front bank BE is lower than that in the rear bank BR.

Thus, the top of the front bank BF is lower in height than that of the rear bank BR, and the actuator 37 in the front bank BF is accordingly lower in height than that in the rear bank BR. As a result, an empty space can be formed above the top of the front bank BF, so that a front bottom surface 115a of the air cleaner case 115 can be stepwise lowered from a rear bottom surface 115b of the air cleaner case 115 as shown in FIG. 11. Accordingly, the capacity of the air cleaner 11 can be ensured without increasing the height of the air cleaner 11.

Further, an increase in height of the fuel tank 12 provided around the air cleaner 11 can be prevented and the capacity of the fuel tank 12 can be ensured.

The following effects can be obtained according to the above preferred embodiment.

(1) The valve stop mechanism is provided in only one of the banks to thereby make the size of the other bank smaller. Further, the throttle valve driving actuator in the bank having no valve stop mechanism is lower in height than the throttle valve driving actuator in the bank having the valve stop mechanism. With this arrangement, an empty space can be formed above the bank having no valve stop mechanism, and the capacity of the air cleaner and the fuel tank can be ensured by utilizing this empty space. Further, the vertical size of the vehicle can be reduced.

(2) The valve operating device in the front bank is of a unicam type, and the valve operating device in the rear bank is of a DOHC type. Accordingly, the height of the front bank can be set smaller than that of the rear bank. Further, the throttle valve driving actuator in the front bank is lower in height than the throttle valve driving actuator in the rear bank, so that an empty space can be formed above the front bank.

Further, the valve stop mechanism is provided in only the rear bank. Accordingly, the cylinder head in the front bank can be reduced in size, so that the height of the front bank can be reduced. Accordingly, an empty space can be formed above the front bank.

The capacity of the air cleaner and the fuel tank can be ensured by utilizing this empty space, so that the vertical size of the vehicle can be reduced. Further, the cylinder head and the cylinder head cover in the front bank can be reduced in size, so that the front wheel of the vehicle can be moved in position toward the rear side of the vehicle, thereby contributing to a decrease in logitudinal size of the vehicle.

(3) The throttle valve driving actuator in each bank is located close to the corresponding cylinder head cover. Accordingly, the amount of upward projection of the actuator can be suppressed, and the capacity of the air cleaner and the fuel tank can be ensured by utilizing the empty space above the corresponding cylinder head. Further, as compared with the case that the actuator is provided in the space between the throttle bodies in the front and rear banks, the actuator can be easily provided.

(4) The front bank has no valve stop mechanism. That is, the engine valves in the front bank are always operated during the operation of the vehicle. The front bank can readily receive a running wind during running of the vehicle, thereby improving the cooling effect to the front bank. On the other hand, when the engine valves in the rear bank having the valve stop mechanism are in a nonoperating condition, excess cooling of the rear bank by the running wind can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A V-type engine for a vehicle having a front bank and a rear bank inclined in a longitudinal direction of said vehicle so as to form a V shape, each of said front bank and said rear bank comprising:
    a cylinder block having a cylinder;
    a piston slidably fitted in said cylinder;
    a cylinder head connected to an upper end of said cylinder block;
    a cylinder head cover connected to an upper end of said cylinder head;
    a combustion chamber defined between said cylinder head and said piston;
    engine valves as intake and exhaust valves exposed to said combustion chamber;
    a valve operating device provided between said cylinder head and said cylinder head cover for operating said engine valves; and
    an actuator for driving a throttle valve;
    wherein either said front bank or said rear bank is provided with a valve stop mechanism for stopping an operation of said engine valves according to an operational condition of said vehicle; and
    said actuator provided in one of said front bank and said rear bank excluding said valve stop mechanism is lower in height than said actuator provided in the other of said front bank and said rear bank including said valve stop mechanism,
    wherein the valve operating device provided on one of the front and rear banks includes a unicam, and the valve operating device provided on the other of the front and rear banks includes more than one cam.

2. The V-type engine for the vehicle according to claim 1, wherein:
    said valve operating device provided in said front bank is the unicam valve operating device including a single camshaft and a rocker arm associated therewith for operating said intake and exhaust valves in combination;
    said valve operating device provided in said rear bank is a DOHC valve operating device including an intake camshaft for operating said intake valve and an exhaust camshaft for operating said exhaust valve; and
    said valve stop mechanism is provided in only said rear bank.

3. The V-type engine for the vehicle according to claim 1, wherein said actuator in each bank is located close to the corresponding cylinder head cover.

4. The V-type engine for the vehicle according to claim 2, wherein said actuator in each bank is located close to the corresponding cylinder head cover.

5. The V-type engine for the vehicle according to claim 1, wherein the valve stop mechanism includes a cylindrical holder fitted in a valve lifter so as to be slidable in the axial direction of a valve stem, a slide pin fitted in the holder so as to be slidable in a direction perpendicular to an axial direction of the valve stem, a coil spring accommodated in a coil spring chamber defined between the holder and the slide pin, and a stopper pin provided in the holder.

6. The V-type engine for the vehicle according to claim 2, further comprising an air cleaner having a cleaner element that is disposed directly above the unicam valve operating device provided in the front bank.

7. The V-type engine for the vehicle according to claim 1, wherein a height of the front bank is set to be smaller than that of the rear bank, and the actuator in the front bank is lower in height than the actuator in the rear bank, so that an empty space is formed above the front bank.

8. The V-type engine for the vehicle according to claim 1, wherein the valve stopping device for each of the engine valves includes a cylindrical holder fitted in a valve lifter so as to be slidable in an axial direction of a valve stem of the engine valve, a slide pin fitted in the holder so as to be slidable in a direction perpendicular to the axial direction of the valve stem, the slide pin having a valve stem insertion hole at an intermediate portion thereof for receiving the valve stem when the slide pin is moved to a predetermined position in the holder.

9. The V-type engine for the vehicle according to claim 7, further comprising an air cleaner having a case with an irregular-shaped lower portion, a forward portion of which extends downwardly into the empty space formed above the front bank, thereby expanding a capacity of the air cleaner.

10. The V-type engine for the vehicle according to claim 8, further comprising an air cleaner having a case with an irregular-shaped lower portion, a forward portion of which extends downwardly into the empty space formed above the front bank, thereby expanding a capacity of the air cleaner.

11. A V-type engine for a vehicle having a front bank and a rear bank inclined in a longitudinal direction of said vehicle so as to form a V shape, each of said front bank and said rear bank comprising:
   a cylinder block having cylinders;
   a piston slidably fitted in each of said cylinders;
   cylinder heads connected to upper ends of said cylinder block;
   cylinder head covers connected to upper end of said cylinder heads;
   combustion chambers defined between said cylinder heads and said pistons;
   engine valves as intake and exhaust valves exposed to said combustion chamber;
   a valve operating device provided between each of said cylinder heads and said cylinder head covers for operating said engine valves; and
   an actuator in each of the valve operating devices for driving throttle valves;
   wherein either said front bank or said rear bank is provided with a valve stop mechanism for stopping an operation of said engine valves according to an operational condition of said vehicle; and
   said actuator provided in one of said front bank and said rear bank excluding said valve stop mechanism is lower in height than said actuator provided in the other of said front bank and said rear bank including said valve stop mechanism,
   wherein the valve operating device of the first bank is a unicam valve operating device including a single camshaft and a rocker arm associated therewith for operating said intake and exhaust valves in combination;
   said valve operating device provided in said rear bank is a DOHC valve operating device including an intake camshaft for operating said intake valve and an exhaust camshaft for operating said exhaust valve.

12. The V-type engine for the vehicle according to claim 11, wherein:
   said valve stop mechanism is provided in only said rear bank.

13. The V-type engine for the vehicle according to claim 11, wherein said actuator in each bank is located close to the corresponding cylinder head cover.

14. The V-type engine for the vehicle according to claim 12, wherein said actuator in each bank is located close to the corresponding cylinder head cover.

15. The V-type engine for the vehicle according to claim 11, wherein the valve stop mechanism includes a cylindrical holder fitted in a valve lifter so as to be slidable in the axial direction of a valve stem, a slide pin fitted in the holder so as to be slidable in a direction perpendicular to an axial direction of the valve stem, a coil spring accommodated in a coil spring chamber defined between the holder and the slide pin, and a stopper pin provided in the holder.

16. The V-type engine for the vehicle according to claim 12, further comprising an air cleaner having a cleaner element that is disposed directly above the unicam valve operating device provided in the front bank.

17. The V-type engine for the vehicle according to claim 11, wherein a height of the front bank is set to be smaller than that of the rear bank, and the actuator in the front bank is lower in height than the actuator in the rear bank, so that an empty space is formed above the front bank.

18. The V-type engine for the vehicle according to claim 11, wherein the valve stopping device for each of the engine valves includes a cylindrical holder fitted in a valve lifter so as to be slidable in an axial direction of a valve stem of the engine valve, a slide pin fitted in the holder so as to be slidable in a direction perpendicular to the axial direction of the valve stem, the slide pin having a valve stem insertion hole at an intermediate portion thereof for receiving the valve stem when the slide pin is moved to a predetermined position in the holder.

19. The V-type engine for the vehicle according to claim 17, further comprising an air cleaner having a case with an irregular-shaped lower portion, a forward portion of which extends downwardly into the empty space formed above the front bank, thereby expanding a capacity of the air cleaner.

20. A V-type engine for a vehicle having a front bank and a rear bank inclined in a longitudinal direction of said vehicle so as to form a V shape, each of said front bank and said rear bank comprising:
   a cylinder block having a cylinder;
   a piston slidably fitted in said cylinder;
   a cylinder head connected to an upper end of said cylinder block;
   a cylinder head cover connected to an upper end of said cylinder head;
   a combustion chamber defined between said cylinder head and said piston;
   engine valves as intake and exhaust valves exposed to said combustion chamber;
   a valve operating device provided between said cylinder head and said cylinder head cover for operating said engine valves; and
   an actuator for driving a throttle valve;
   wherein either said front bank or said rear bank is provided with a valve stop mechanism for stopping an operation of said engine valves according to an operational condition of said vehicle; and
   said actuator provided in one of said front bank and said rear bank excluding said valve stop mechanism is lower in height than said actuator provided in the other of said front bank and said rear bank including said valve stop mechanism,
   wherein said valve operating device provided in said front bank is a unicam valve operating device including a single camshaft and a rocker arm associated therewith for operating said intake and exhaust valves in combination;
   said valve operating device provided in said rear bank is a DOHC valve operating device including an intake camshaft for operating said intake valve and an exhaust camshaft for operating said exhaust valve.

* * * * *